United States Patent
Chrisop et al.

(10) Patent No.: US 7,099,023 B2
(45) Date of Patent: Aug. 29, 2006

(54) AUDIT TRAIL SECURITY SYSTEM AND METHOD FOR DIGITAL IMAGING DEVICES

(75) Inventors: Roy Kenneth Chrisop, Camas, WA (US); Tanna Marie Sturm, Lake Oswego, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 886 days.

(21) Appl. No.: 09/875,426

(22) Filed: Jun. 5, 2001

(65) Prior Publication Data

US 2002/0181006 A1 Dec. 5, 2002

(51) Int. Cl.
  *G06K 15/00* (2006.01)
(52) U.S. Cl. ...................................... 358/1.14; 358/1.15
(58) Field of Classification Search ................ 358/1.14, 358/1.15, 1.01, 1.6, 1.13
  See application file for complete search history.

(56) References Cited

U.S. PATENT DOCUMENTS

| 4,894,805 A | 1/1990 | Godshalk et al. | ........... 365/222 |
|---|---|---|---|
| 5,163,088 A | 11/1992 | LoCascio | ..................... 379/95 |
| 5,642,199 A | 6/1997 | Ukai et al. | .................. 358/296 |
| 2004/0133793 A1 * | 7/2004 | Ginter et al. | ................ 713/193 |

FOREIGN PATENT DOCUMENTS

JP   2000353172   12/2000

* cited by examiner

*Primary Examiner*—Arthur G. Evans
(74) *Attorney, Agent, or Firm*—Law Office of Gerald Maliszewski; Gerald Maliszewski

(57) ABSTRACT

A system and method have been provided for maintaining security in a network of imaging devices, such as copiers, scanners, printers, fax machines, and the like. In response to performing an imaging function, a copy of the document is sent to a security auditor for storage. In addition, other features such as user identification, the destination (if the document is sent), and the kind of imaging function performed (copy, print, send) can be stored and cross-referenced with the documents. The network can analyze the documents in storage for security purposes based upon factors such as user identification, document recipients, client number, and document subject matter, to name but a few.

32 Claims, 3 Drawing Sheets

AUDIT TRAIL SECURITY SYSTEM AND METHOD FOR DIGITAL IMAGING DEVICES

BACKGROUND OF THE INVENTION

1. Field of the Invention

This invention generally relates to document management systems and, more particularly to a system and method for maintaining an audit trail of documents that are created, printed, or sent in a network of imaging devices.

2. Description of the Related Art

A large variety of digital imaging devices exist that enable users to duplicate and distribute document via hardcopy, email, or fax. These imaging devices include scanners, copiers, printers, and fax machines, operating as either as stand-alone devices or working in cooperation with computers. Imaging devices include devices that have a single function, or ones that can perform multiple functions. With this distribution and duplication capability comes increased security concerns. Users have the ability to take, send, or distribute information that a company or government may find confidential, and distribute it to anyone in the world.

Conventionally, the security of documentation handling is addressed by some of the following methods. One method tracks the number of copies or prints that each user makes. However, this method does not provide any record of the document contents. A second security method marks any documents output by an imaging device to prevent future copying, or to track which imaging device creates the document. However, placing a security mark on an image to prevent future copying only works for copies and prints. Users still have the ability to take confidential hardcopy documents, scan them, and send via email or fax to anyone. A third set of security solutions perform tracking, auditing, or monitoring functions through separate security unit attachments to each imaging device. However, separate security units add more clutter to the imaging devices and information retrieval is slow. If an administrator wants to determine what a specific employee has been copying, then the information must be separately gathered from each imaging device.

It would be advantageous if, in addition to the identity of the user and the number of copies made, the contents of a copied document could tracked for auditing purposes. Likewise, it would be advantageous if the imaging device functions and document destinations could be tracked for auditing and security purposes.

It would be advantageous if document auditing data could be collected from a network of imaging devices and stored with a centralized security auditor.

It would be advantageous if the document records from the entire network of imaging devices could be reviewed and analyzed by a centralized security auditor.

SUMMARY OF THE INVENTION

The present invention enables commercial or governmental agencies with a large number of imaging devices to more completely track the duplication and distribution of documents. The tracking is accomplished through the use of a networked security system.

More specifically, the invention is a security system for imaging devices, including multi- or single-function devices with capabilities such as copy, print, scan, email, Internet fax, and telephone fax. The security system stores images of the documents being duplicated or distributed, along with the users identification, in a database or record maintained on the network. This database is searchable by an administrator to determine if any confidential documents have been distributed and if they have, by whom.

Accordingly, a method has been provided for maintaining security over the imaging of documents in a network of imaging devices. The method comprises: performing a document imaging function at an imaging device; communicating imaging activity from a plurality of imaging devices to the security auditor; maintaining a record of imaging device activity by the security auditor; and, from the record of imaging device activity, analyzing the recorded imaging device activity.

As used herein, performing a document imaging function includes activities such as copying, scanning, locally printing, remotely printing, storing the document as an electronic file, sending the document as email, and sending the document as Internet or telephone facsimile. Thus, communicating imaging activity from a plurality of imaging devices to the security auditor includes transmitting a copy of the document to the security auditor. Likewise, maintaining and analyzing imaging activity means storing and analyzing the documents.

In some aspects of the invention the method further comprises: entering a user identification into the imaging device. Therefore, the user identification can be transmitting with the copy of the document. Likewise, the security auditor cross-references user identification with the corresponding documents in the record.

Analyzing the record of imaging device activity includes analyzing imaging activity by criteria such as user identification, the image activity function, the imaging device IP address, date, time, the number of pages in the document, the number of documents, the client number, the job number, the destination IP address, destination email, and the destination phone number. In some aspects of the invention an optical character recognition (OCR) scan of the documents is received by the security auditor. Then, the record of documents can be analyzed by keyword searches or image searches.

The method further comprises selecting the maintenance mode. Various modes maintain intermittent pages from each document, maintain intermittent documents, maintain documents by the imaging function used, the destination (telephone, IP, or email), or by user identification. Further, the method comprises selecting the age of documents to be maintained by the security auditor.

Additional details of the above-described method and a security system for imaging devices are provided below.

DETAILED DESCRIPTION OF THE PREFERRED EMBODIMENTS

Figure 1:
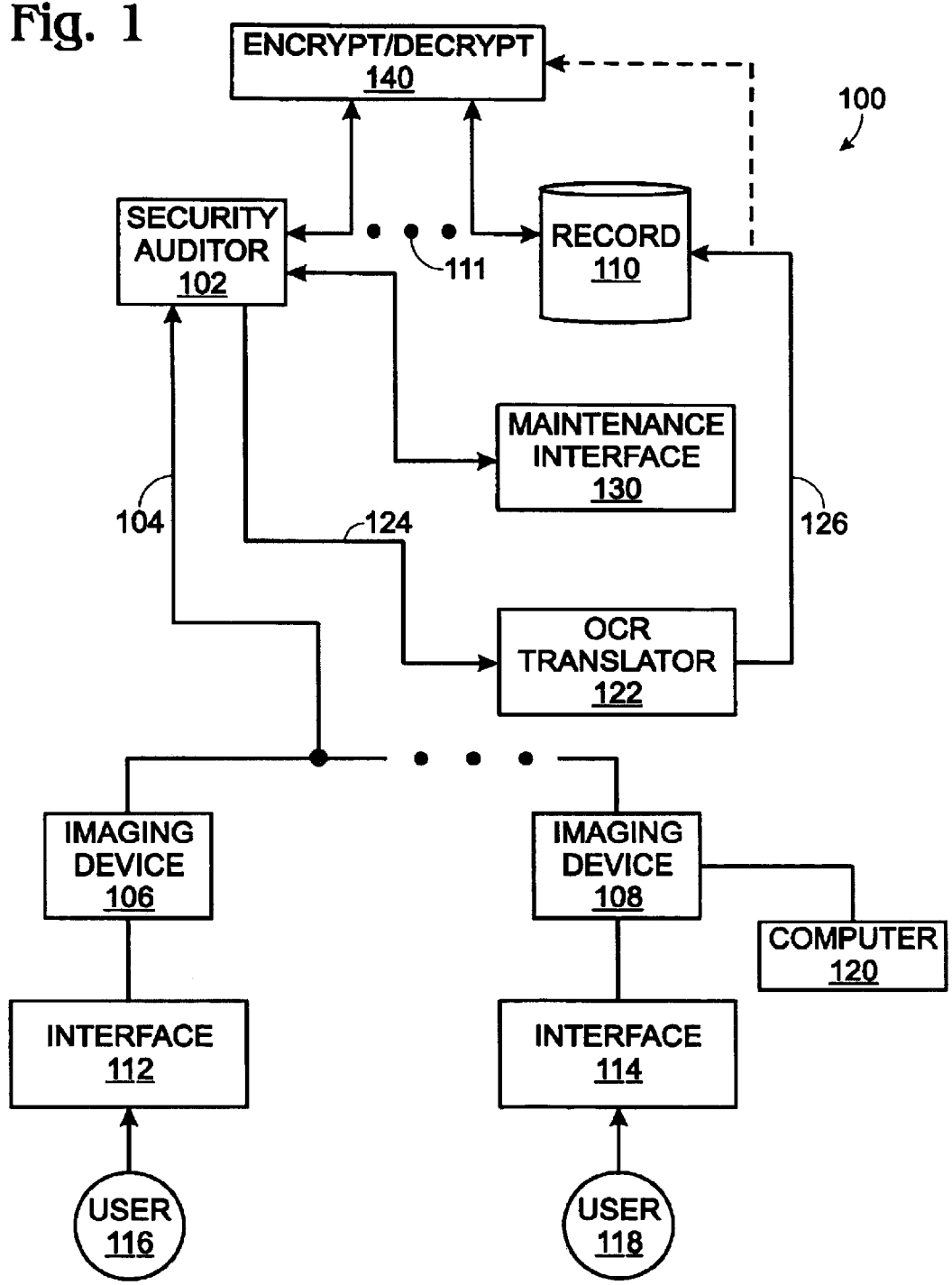
FIG. 1 is a schematic block diagram of the present invention security system for imaging devices.

FIG. 1 is a schematic block diagram of the present invention security system for imaging devices. The system 100 comprises a security auditor 102 having a communications port connected on line 104. The system also comprises a plurality of digital imaging devices; two imaging devices 106 and 108 are actually shown, but the present invention is not limited to any particular number of imaging devices. Each imaging device has a communication port connected to the security auditor on line 104 to send information regarding imaging device activity. There exist a number of networking system and network protocols using special purpose cables, hardlines, phone lines, and even radio frequency (RF) connections that could be used by one skilled in the art to enable the above-described interfaces.

The security auditor 102 is connected to the port of a record or database 110 on line 111. The record 110 stores imaging device activity, and makes the imaging device activity available to the security auditor 102 for the analysis of network security. The record 110 can be co-located with the security auditor 102, remotely located, or distributed among a plurality of servers that may, or may not be co-located. It should also be understood that the security auditor 102 refers more to a function than a specific machine or location. That is, a user or software application with security auditor authority may choose to access the system 100 through any one of a plurality of machines and locations. Alternately, the security auditor function can be enabled on specialized computers, for example computers having restricted access or private network features.

Imaging devices 106 and 108 have an interface, 112 and 114 respectively, to perform an imaging function to a document presented, recalled, created, accessed, or otherwise provided by a user 116 and 118, respectively. In response to performing a document imaging function, each imaging device 106/108 transmits a copy of the document to the security auditor 102. The security auditor 102 records the copy of the document received from the imaging devices 106/108. That is, the documents are sent to the record 110.

Each imaging device interface 112/114 performs at least one imaging function, although it is possible for an imaging device to perform multiple functions. The possible imaging functions performed by each interface 112/114 include copying and locally printing, that is printing the document to the imaging device to which the interface is directly attached. The functions also include remotely printing, or printing to another imaging device in the system. For example, presenting a document to interface 114 to be printed at imaging device 106.

Other imaging functions include scanning, optical character recognition (OCR) scanning and conversion, storing the document as an electronic file in any selected medium, either at the imaging device itself or at an attached computer. A computer, server, or storage device 120 is shown attached to imaging device 108. Alternately, a computer or storage medium device is part of (internal to) the imaging device. Additional imaging functions include sending the document as email, sending the document to an IP address, and sending the document as facsimile (either Internet or telephone). Note that the connections to a supporting computer or the email and (Internet and telephone) fax destinations can be made through network connection 104 or through independent connections and networks (not shown).

Typically, each imaging device has an interface to enter a user identification. For simplicity and clarity, it will be assumed that the image function interfaces 112/114 also serve as user identification interfaces. Each imaging device 106/108 transmits the user identification with the copy of the document to the security auditor 102. The security auditor 102 cross-references the user identification to documents in the record 110. The imaging device user identification interfaces 112/114 accept user identification such as personal identification numbers (PINs), network username, or passwords that can be entered on a keypad, or the equivalent. Alternately but not shown, a different interface than the image function interfaces 112/114 can be used to accept user photo identification and biometric data such as instant DNA, retina scans, fingerprints, and the like. Further, the interface can be a magnetic card reader to read a magnetic card the is assumed to be in the possession of a particular user or user group, or any other device that identifies a user.

The image function interfaces 112/114 can also be used to accept information such as client and job numbers associated with the document, and the security auditor 102 can cross-reference either (or both) of the client and job numbers to the documents that are inserted and maintained in the record 110.

Once documents have been entered and stored in the record 110, the security auditor can analyze imaging activity using a large variety of functions. For example an analysis can be made based on user identification, the image activity function performed by imaging devices 106/108, the IP address of imaging devices 106/108, the IP address of the destination to which a document is sent, the phone number of the destination to which a document is sent, the destination email address, or the recipient. In addition, analysis can be made by the date or time of the imaging activity, the number of pages in the document, the number of document copies that are made, sent, or printed, or other wise distributed, the client number associated with the documents, and the job number associated with the documents.

Some aspects of the invention further comprise an optical character recognition (OCR) translator 122 having a port connected to the security auditor on line 124 and a port connected to the record 110 on line 126. In some aspects of the invention the OCR scanned document is encrypted before it is stored in the record 110. Preferably (as shown), the OCR translator 122 functions on the host (security auditor) side of the system 100, as it may be unnecessarily burdensome for each imaging device to OCR scan a document, in addition to performing the task selected by the user. If the user selected imaging function is an OCR scanning function, then the imaging device may be able to directly deliver an OCR scanned version of the document for storage. In this scenario, the imaging device and security auditor must run compatible software, or the document, OCR scanned at the imaging device, must be translated at the security auditor into a compatible format. Alternately, continued improvements in OCR software and supporting hardware may enable each imaging device to deliver OCR scanned documents to the security auditor 102 in parallel, and in addition to, the imaging function selected by the imaging device user. Then, the separate host side OCR translator 122 can be eliminated.

The security auditor 102 sends documents received from the imaging devices 106/108 to the OCR translator 122. After OCR scanning, the security auditor 102 stores the OCR scanned documents in the record 110. These OCR scanned documents can be made available for additional kinds of security analysis. For example, the security auditor can select a set of keywords, and analysis of the imaging activity can be based upon a search for the set of keywords in the OCR scanned documents in the record. Likewise, an analysis can be made on the basis of a selected image. It should also be understood that a security analysis can be made on the basis of a combination of functions, such as keywords and user identification, or user identification, date, and destination (telephone, IP, or email).

In some aspects of the invention the system 100 includes a security auditor interface 130 for selecting a maintenance mode. The security auditor 102 maintains a record of the scanned documents in response to the selected maintenance mode. For example, if the security auditor maintenance mode interface 130 accepts an intermittent page maintenance mode, the security auditor intermittently saves pages of the document received from the imaging device. The saving of the pages can be based upon a random or user defined selection criteria. For example, the first page of each document can be saved in the record 110. Likewise, an intermittent document mode can be selected. Then, documents are intermittently stored in the record. Again the selection algorithm can be random of user defined.

In another example, the maintenance mode interface 130 accepts a user identification maintenance mode. Then, the security auditor saves documents in response to the user identification associated with the documents. Likewise, a destination mode can be selected. Then, when the imaging device performs an imaging function that involves sending a document to a destination (telephone number, IP address, or email address) or a location, the security auditor saves documents in the record 110 in response to destinations to which the documents are sent. Again, the maintenance mode can be selected to be a combination of factors, such as saving documents in response to a combination of user and destination.

In some aspects of the invention the system 100 includes a security auditor interface for selecting the age of document to be maintained. For the sake of simplicity it will be assumed that this function is performed at interface 130. However, it should be understood that the security auditor can be enabled with an ageing mode selection interface without necessarily having a maintenance mode interface as described above. The security auditor 102 purges the record 110 of documents having an age greater than the selected maintenance age. Alternately, the interface 130 supplies a maintenance age warning when a document reaches the selected age. The interface then accepts a warning selection (from a user or software application) in response to providing the maintenance age warning. Then, the security auditor 102 purges the record 110 of documents in response to the warning selection made at interface 130. For example, the maintenance age can be set to 30 days. But in response to a warning that a set of documents have reached the 30 day mark, a user may select to maintain some documents, purge other documents, and move still other documents to a different storage database.

In some aspects of the invention the system includes an encryption device 140 with ports, shown optionally connected between the security auditor 102 and the record 110 on line 111. The encryption device 140 receives documents from the security auditor 102 for encryption and storage in the record 110. The encryption device 140 receives documents from the record 110 for decryption and supply to the security auditor 102. The security auditor 102 encrypts the documents received from the imaging devices 106/108, and prior to analyzing the record of imaging device activity, decrypts the documents. The encryption device 140 optionally encrypts OCR scanned document received on line 126 from the OCR translator 122.

It should be understood that although the security auditor 102 is shown connected to the OCR translator 122, the record 110, the maintenance interface 130, and the encryption device 140 with separate lines, the connections can also be made between all these devices through the use of a data bus, such as line 104, in some aspects of the invention.

Figure 2:
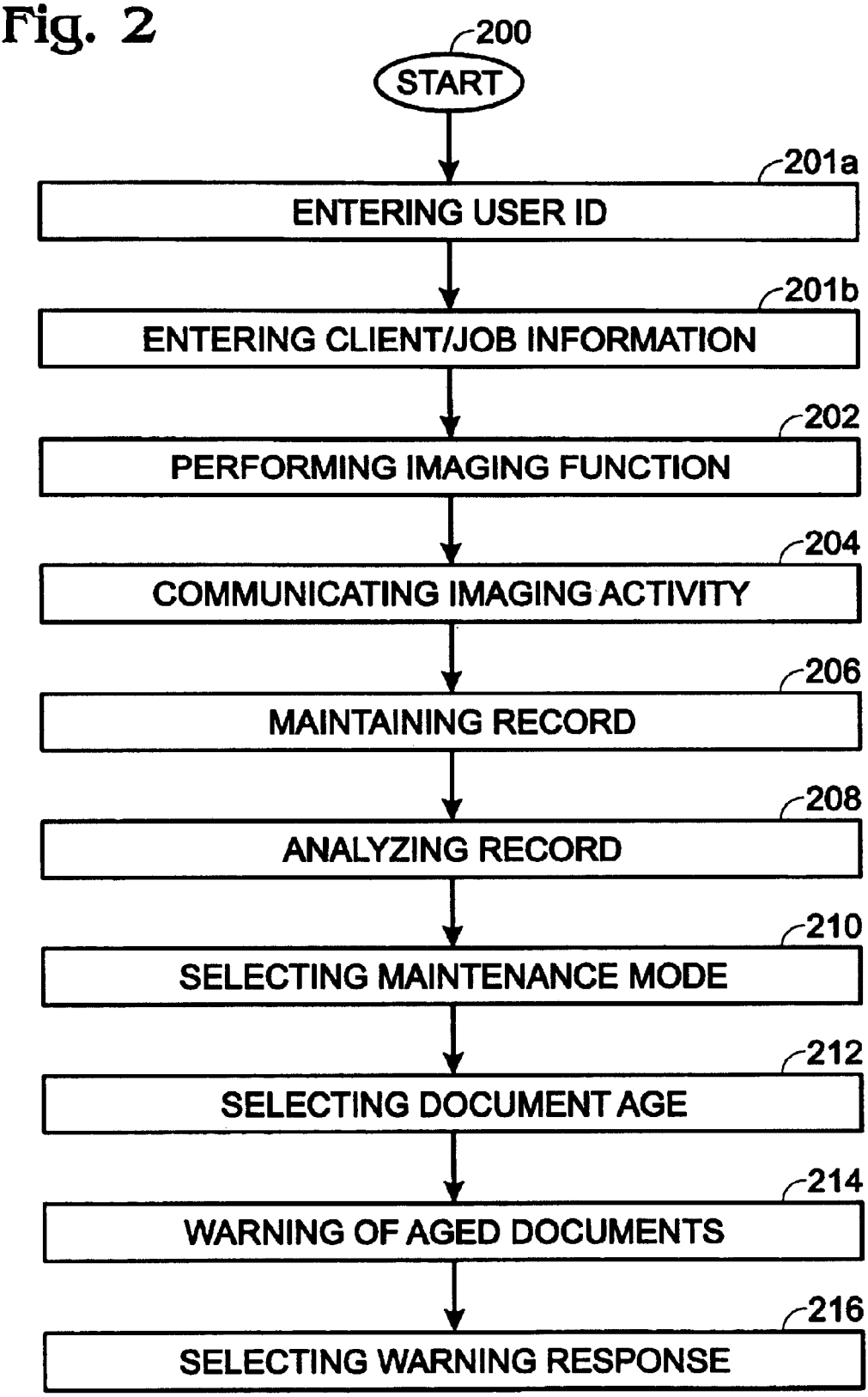
FIG. 2 is a flowchart illustrating a method for maintaining security over the imaging of documents in a network of imaging devices.

FIG. 2 is a flowchart illustrating a method for maintaining security over the imaging of documents in a network of imaging devices. Although the method is depicted as a sequence of numbered steps for clarity, no order should be inferred from the numbering unless explicitly stated. The method begins at Step 200. Step 202 performs a document imaging function at an imaging device. Performing a document imaging function at an imaging device includes copying, scanning, optical character recognition (OCR) scanning, locally printing, remotely printing, storing the document as an electronic file, sending the document as email, sending the document to an IP address, sending the document as an Internet fax, and sending the document as a telephone facsimile. Step 204 communicates imaging activity from a plurality of imaging devices to a security auditor. Step 206 maintains a record of imaging device activity by the security auditor. Step 208, from the record of imaging device activity, analyzes the imaging device activity.

Thus, communicating imaging activity from a plurality of imaging devices to the security auditor in Step 204 includes transmitting a copy of the document to the security auditor. Likewise, maintaining and analyzing imaging activity in Step 206 and 208 include maintaining and analyzing documents.

Some aspects of the invention include a further step. Step 201a enters a user identification into the imaging device. Then, communicating imaging activity from a plurality of imaging devices to the security auditor in Step 204 includes transmitting the user identification with the copy of the document. Maintaining a record of imaging device activity by the security auditor in Step 206 includes cross-referencing user identification with the record of documents. Entering a user identification into the imaging device in Step 201 includes entering a user identification selected from the group including personal identification numbers (PINs), user photo identification, network username, passwords, magnetic card, and biometric data.

In some aspects Step 201b enters information into the imaging device selected from the group including client and job number. Then, Step 206 includes cross-referencing information selected from the group including client and job number with the record of documents.

Step 208 includes analyzing imaging activity by functions selected from the group including user identification, the image activity function, the imaging device IP address, recipient, date, time, the number of pages in the document, the number of documents, the client number, the job number, the destination IP address, destination email address, and the destination phone number. When Step 206 includes performing an OCR scan of the documents received by the security auditor, then Step 208 includes analyzing imaging activity by functions selected from the group including recognizing selected keywords in the document and recognizing selected images in the document.

In some aspects of the invention a further step, Step 210 selects the maintenance mode, and maintaining a record of imaging device activity by the security auditor in Step 206 includes maintaining a record of documents received by the security auditor in response to the selected maintenance mode. For example, when an intermittent page maintenance mode is selected in Step 210, maintaining a record of imaging device activity by the security auditor in Step 206 includes intermittently saving pages of the document received by the security auditor. When an intermittent document maintenance mode is selected in Step 210, Step 206 includes intermittently saving documents received by the security auditor.

When selecting the maintenance mode in Step 210 includes selecting an imaging function maintenance mode, maintaining a record of imaging device activity by the security auditor in Step 206 includes saving documents received by the security auditor in response to the function performed by the imaging device. When selecting the maintenance mode in Step 210 includes selecting a user identification maintenance mode, Step 206 includes saving documents received by the security auditor in response to the user identification associated with the scanned documents. When a destination maintenance mode is selected in Step 210 and Step 202 includes the imaging function sending the document to an address (destination, location, or the equivalent), such as telephone number, IP address, and email address, Step 206 includes saving documents received by the security auditor in response to the address to which the document is sent.

In some aspects of the invention a further step, Step 212 selects the age of documents to be maintained by the security auditor. Then, maintaining a record of imaging device activity at the security auditor in Step 206 includes purging the record of documents having an age greater than the selected maintenance age. Step 214 warns when maintained documents reach the selected maintenance age and Step 216 selects a maintenance age warning response. Then, maintaining a record of imaging device activity at the security auditor in Step 206 includes purging the record of documents in response to the maintenance age warning selection made in Step 216.

In some aspects of the invention maintaining a record of imaging device activity by the security auditor in Step 206 includes encrypting the documents received from the imaging devices. Then, the method further comprises Step 207 (not shown), prior to analyzing the recorded imaging device activity, of decrypting the documents maintained by the security auditor.

Figure 3:
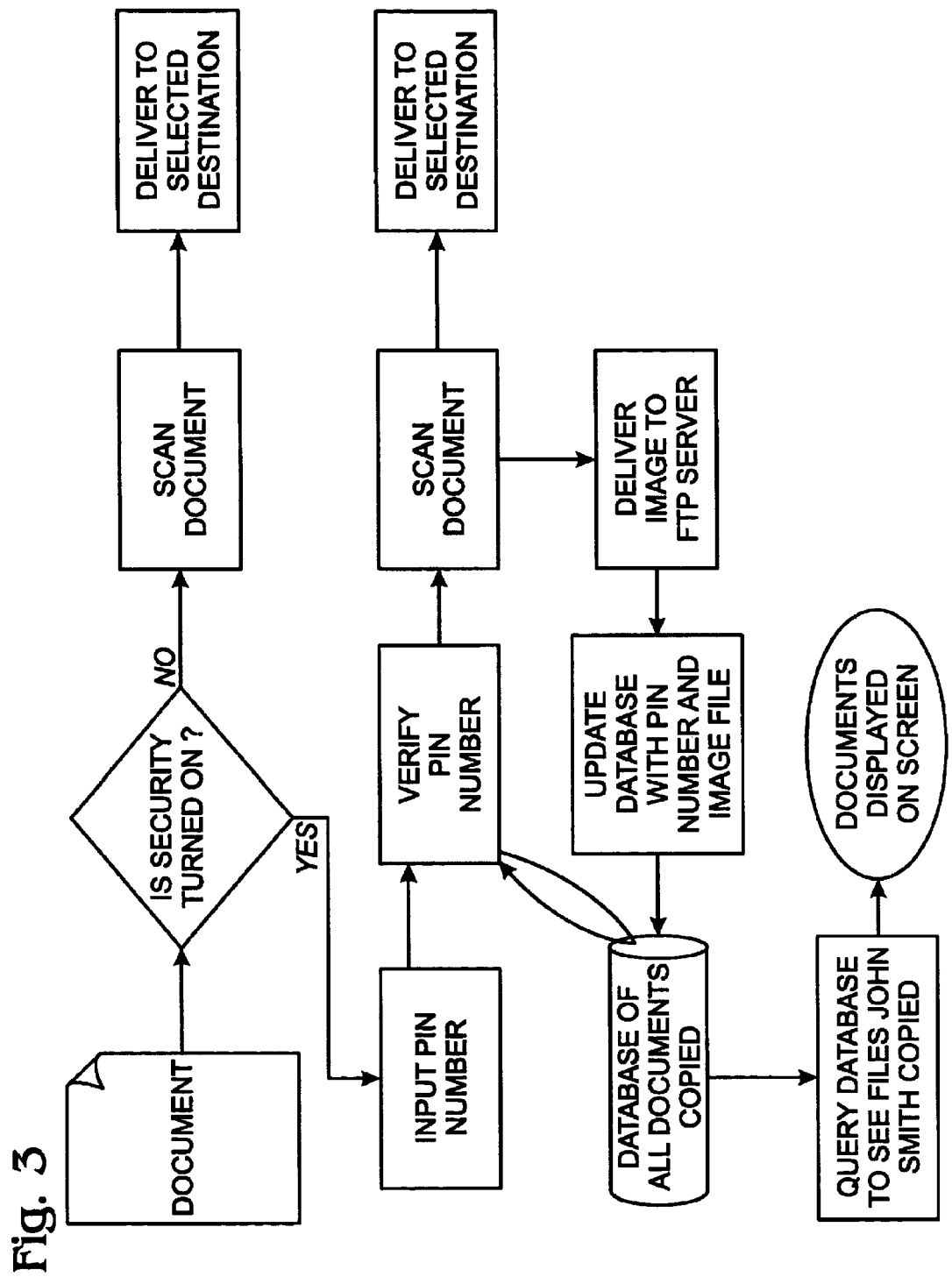
FIG. 3 is a diagram illustrating an alternate representation of the invention.

FIG. 3 is a diagram illustrating an alternate representation of the invention. As mentioned above, the security auditor can configure a number of system settings. Information passed to the database (record) can include user name or ID, the image, name or IP address of the imaging device, number of pages and copies, output type (e.g. fax), recipient, client and job number, document destination (telephone, IP, email), and the date and time.

The security auditor may not want to store all images because of the storage space required for such as task. Therefore, the following options exist for storing jobs: one randomly selected out of every n jobs or x number of pages out of every (n)job(s). These options can also be set based on the function or destination. For example, the security auditor may want a copy of every image that is sent via email, but may not care about documents scanned to an FTP server on the network.

The security auditor can set a certain time period or amount of storage space at which old data will be deleted. The security auditor can choose to receive a warning before this takes place and export the data to a different location if desired.

The security auditor may have a need to search the database on keywords, rather than the user's name or ID. The system provides this functionality with a search utility that OCR's and indexes all of the images. Further, the database or record has an encryption option to protect the data in case of theft.

Many imaging devices currently have user accounting packages installed that track the number of jobs by each user for billing purposes or restrict access for security. The present invention works in conjunction with these systems. During the "verify PIN number" step, verification can be done against the existing accounting system rather than against the database. Other authentication methods besides a PIN number can also be used. For example, NT username, password or fingerprinting. A camera can also be attached to the imaging device to take a picture of the user and store it along with the other data. This feature protects against password or PIN theft.

A system and method have been provided for maintaining security in a network of imaging devices. A few examples have been given of the kind of data that can be stored, and the types of analysis that can be performed on the stored data. However, other variations and embodiments will occur to those skilled in the art.

We claim:

1. In a network of imaging devices, a method for maintaining security over the imaging of documents, the method comprising:

selecting a maintenance mode;

accepting a paper medium document at an imaging device;

performing a document imaging function selected from the group including copying, scanning, optical character recognition (COR) scanning, locally printing, remotely printing, storing the document as an electronic file, sending the scanned document as email, sending the scanned document to an IP address, sending the scanned document as an Internet fax, and sending the scanned document as a telephone facsimile;

communicating the document imaging function to a security auditor;

in response to the selected maintenance mode, maintaining a record of document imaging functions, including a record of documents received by the security auditor; and, from the record of document image functions, identifying security information accociated with a document.

2. The method of claim 1 wherein communicating document image functions to the security auditor includes transmitting a copy of the document to the security auditor.

3. The method of claim 1 further comprising:

entering a user identification into the imaging device; and wherein communicating document imaging functions to the security auditor includes transmitting the user identification with the copy of the document.

4. The method of claim 3 wherein maintaining a record of document imaging functions by the security auditor includes cross-referencing user identification with the record of documents.

5. The method of claim 4 wherein entering a user identification into the imaging device includes entering a user identification selected from the group including personal identification numbers (PINs), magnetic card, user photo identification, network username, passwords, and biometric data.

6. The method of claim 4 further comprising:

entering information into the imaging device selected from the group including client and job number; and, wherein maintaining a record of document imaging functions by the security auditor includes cross-referencing information selected from the group including client and job number, with the record of documents.

7. The method of claim 6 wherein identifying security information associated with document includes analyzing information selected from the group including user identification, the image activity function, the imaging device IP address, recipient, date, time, the number of pages in the document, the number of documents, the client number, the job number, the destination IP address, the destination email address, and the destination phone number.

8. The method of claim 7 wherein maintaining a record of document imaging function by the security auditor includes performing an OCR scan of the documents received by the security auditor; and, wherein identifying security information associated with the document includes analyzing functions selected from the group including recognizing selected keywords in the document and recognizing selected images in the document.

9. The method of claim 1 wherein selecting the maintenance mode includes selecting an intermittent page maintenance mode; and wherein maintaining a record of document imaging functions by the security auditor includes intermittently saving pages of the document received by the security auditor.

10. The method of claim 1 wherein selecting the maintenance mode includes selecting an intermittent document maintenance mode; and wherein maintaining a record of document imaging functions by the security auditor includes intermittently saving documents received by the security auditor.

11. The method of claim 1 wherein selecting the maintenance mode includes selecting an imaging function maintenance mode; and wherein maintaining a record of document imaging functions by the security auditor includes saving documents received by the security auditor in response to the function performed by the imaging device.

12. The method of claim 1 wherein selecting the maintenance mode includes selecting a user identification maintenance mode; and wherein maintaining a record of document imaging functions by the security auditor includes saving documents received by the security auditor in response to the user identification associated with the scanned documents.

13. The method of claim 1 wherein selecting the maintenance mode includes selecting a destination maintenance mode;

wherein performing a document imaging function includes sending the document to a destination; and, wherein maintaining a record of document imaging functions by the security auditor includes saving documents received by the security auditor in response to the destination to which the document was sent.

14. The method of claim 1 further comprising:

selecting the age of documents to be maintained by the security auditor; and wherein maintaining a record of document imaging functions by the security auditor includes purging the record of documents having an ago greater than the selected maintenance age.

15. The method of claim 14 further comprising:

warning when maintained documents reach the selected maintenance age;

selecting a maintenance age warning response; and, wherein maintaining a record of document imaging functions at the security auditor includes purging the record of documents in response to the maintenance age warning selection.

16. The method of claim 1 wherein maintaining a record of document imaging functions by the security auditor includes encrypting the documents received from the imaging devices; and, the method further comprising:

prior to identifying security information associated with a document, decrypting the documents maintained by the security auditor.

17. A security system for imaging devices, the system comprising:

a security auditor having a communications port and an interface for selecting a maintenance mode;

a plurality of digital imaging devices selected from the group including scanners, copiers, printers, and fax machines, each having an interface to accept a paper medium document and perform a document imaging function selected from the group including copying, scanning, optical character recognition (OCR) scanning, locally printing, remotely printing, storing the document as an electronic file, sending the scanned document as email, sending the scanned document to an IP address, sending the scanned document as an Internet fax, and sending the scanned document as a telephone facsimile, and each imaging device having a communication port connected to the security auditor port to send document imaging functions;

a record having a port connected to the security auditor port for maintaining a record of document imaging functions maintained by the security auditor and available for security analysis; and wherein the security auditor maintains the record of the documents in response to the selected maintenance mode.

18. The system of claim 17 wherein each imaging device has an interface to select a document imaging function and wherein each imaging device, in response to performing a document imaging function, transmits a copy of the document to the security auditor; and wherein the security auditor sends a copy of the document to the record.

19. The system of claim 17 wherein each imaging device has an interface to enter a user identification, and wherein the imaging device transmits the user identification with the copy of the document to the security auditor.

20. The system of claim 19 wherein the security auditor cross-references the user identification to the documents in the record.

21. The system of claim 20 wherein each imaging device has an interface to accept information selected from the group including client and job number; and, wherein the security auditor cross-references the client and job numbers to the documents in the record.

22. The system of claim 21 wherein the security auditor analyzes document imaging functions selected from the group including user identification, the image activity function, the imaging device IP address, destination IP address, destination email address, destination phone number, recipient, date, time, the number of pages in the document, the number of copies of the document, the client number, and the job number.

23. The System of claim 22 further comprising:
an optical character recognition (OCR) translator having a port connected to the security auditor port to receive and scan documents sent from the imaging devices, and a port connected to the port of the record to send OCR scanned documents; and,
wherein the security auditor analyzes document imaging functions selected from the group including recognizing selected keywords in the OCR scanned document and recognizing selected images in the OCR scanned document.

24. The system of claim 17 wherein security auditor maintenance mode interface accepts an intermittent page maintenance mode, and intermittently saves pages of the document received from the imaging device.

25. The system of claim 17 wherein security auditor maintenance mode interface accepts an intermittent document maintenance mode, and intermittently saves documents received from the imaging device.

26. The system of claim 17 wherein security auditor maintenance mode interface accepts an imaging function maintenance mode, and saves documents in response to the function performed by the imaging device.

27. The system of claim 17 wherein security auditor maintenance mode interface accepts a user identification maintenance mode, and saves documents in response to the user identification associated with the documents.

28. The system of claim 17 wherein security auditor maintenance mode interface accepts a destination maintenance mode;
wherein the imaging device performs a function that sends the document to a destination; and,
wherein the security auditor saves documents in response to destination to which the document was sent by the imaging device.

29. The system of claim 17 wherein the security auditor has an interface for selecting the age of the document to be maintained, and purges the record of documents having an age greater than the selected maintenance age.

30. The system of claim 29 wherein the security auditor has an interface to supply a maintenance age warning and to accept a warning selection, and wherein the security auditor purges the record of documents in response to the warning selection.

31. The system of claim 20 wherein the imaging device user identification interface accepts user identification selected from the group including personal identification numbers (PINS), magnetic cards, user photo identification, network username, passwords, and biometric data.

32. The system of claim 17 further comprising:
an encryption device having a port connected to the security auditor and a port connected to the record;
wherein the encryption device receives documents from the security auditor for encryption and storage in the record;
wherein the encryption device receives documents from the record for decryption and supply to the security auditor; and,
wherein the security auditor encrypts the documents received from the imaging devices, and prior to analyzing the record of document imaging functions, decrypts the documents.

* * * * *